No. 870,615. PATENTED NOV. 12, 1907.
B. BRAZELLE.
WIRE ROPE PACKING AND PROCESS OF PRODUCING SAME.
APPLICATION FILED DEC. 26, 1906.
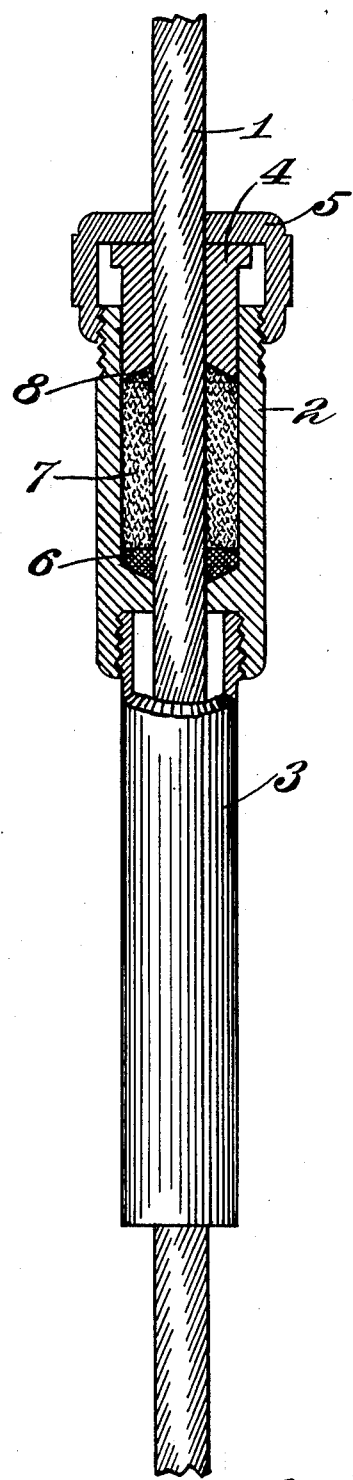
Witnesses:
J. B. Megown,
Geo. H. Williams.
Inventor:
Benjamin Brazelle,
By Carr & Carr
Attys.

UNITED STATES PATENT OFFICE.

BENJAMIN BRAZELLE, OF KIRKWOOD, MISSOURI, ASSIGNOR TO A. LESCHEN & SONS ROPE COMPANY, OF ST. LOUIS, MISSOURI, A CORPORATION OF MISSOURI.

WIRE-ROPE PACKING AND PROCESS OF PRODUCING SAME.

No. 870,615.  Specification of Letters Patent.  Patented Nov. 12, 1907.

Application filed December 26, 1906. Serial No. 349,479.

*To all whom it may concern:*

Be it known that I, BENJAMIN BRAZELLE, a citizen of the United States, and a resident of the city of Kirkwood, county of St. Louis, and State of Missouri, have invented a new and useful Improvement in Wire-Rope Packing and Process of Producing Same, of which the following is a specification.

Heretofore, divers attempts have been made to utilize wire rope in the operation of water and oil wells; but on account of the interstices in the rope, great difficulty has been found in preventing leakage.

The principal object of the present invention is to prevent this leakage; and the invention consists principally in filling the interstices of the rope with a packing of a kind hereinafter more fully described.

The accompanying drawing, which forms part of this specification, is a sectional view of a stuffing box and a rope passing therethrough illustrating the use of my invention.

On account of the interstices in a wire rope it is impracticable to use such rope for an oil well without filling such interstices. On account of the solvent action of the oil, many of the materials used for packing elsewhere are not available for use in an oil well; and, on account of the character and location of the interstices, many other packing materials, such as the fibrous backings, are insufficient to prevent leakage.

To overcome the difficulties above mentioned, I impregnate the wire rope with a packing of plastic material of a composition adapted to resist the solvent action of the oil and sufficiently viscid to resist displacement under the pressures to which the rope of an oil well is exposed in practice   For these reasons I prefer to use a mixture of beeswax and resin in substantially equal proportions. On account of the presence of the beeswax, this mixture or composition is sufficiently plastic for ordinary purposes, whereas a larger percentage of beeswax renders the composition more expensive   Before applying the packing material, it is melted or liquefied by heating in order to more thoroughly impregnate and fill the interstices of the wire rope. When this material cools, it is sufficiently plastic to constitute a good packing and is of such tenacity as to resist the pressure to which the well rope is submitted.

The accompanying drawing illustrates a suitable way of applying my invention.

This drawing illustrates a wire rope 1 passing through a stuffing box 2 screwed onto the end of a tubular piston rod 3. The lower portion of the stuffing box is contracted to substantially the diameter of the wire rope. In the upper end of the stuffing box is a tubular packing gland or crowder 4 and screw-threaded upon the upper end of said stuffing box is a threaded cap 5 arranged to bear against said crowder or packing gland and provided with a hole for the rope.

In order to pack the wire rope, the cap and crowder are raised clear of the stuffing box and a small quantity of fibrous packing 6 is inserted into the lower end of the stuffing box. Then the lower portion of the stuffing box is filled up to the desired level with the melted or liquefied beeswax packing composition 7, which enters and fills the interstices of the rope. The fibrous packing is intended to prevent the leakage of the melted compostion until it cools and to hold it against displacement later. A second layer 8 of the fibrous packing is preferably placed on top of the beeswax composition. The packing gland or crowder is then brought into position and adjusted by means of the cap. In consequence of this application of the oil-resistant packing, leakage is prevented and it becomes feasible to use a wire rope for pumping oil.

Obviously, the composition hereinafter described admits of considerable variation without departing from my invention, and I do not wish to be restricted to said composition. So, too, it is not necessary to melt said composition, as it may be applied otherwise, as by pressure.

What I claim is:

1. The improvement in the process of packing wire rope for use in oil wells which consists in filling the hole through which said rope passes with a plastic packing material insoluble in the liquid of the well and causing said packing to fill the interstices of said rope.

2. The improvement in the process of packing wire rope for use in oil wells which consists in liquefying an oil resistant packing material and filling the hole through which the rope passes together with the interstices of said rope with said material while liquefied.

3. The combination of a wire rope, a stuffing box and a packing of plastic material filling the interstices of said rope.

4. The combination of a wire rope, a stuffing box and a packing of oil-resistant material filling the interstices of said rope.

5. The combination of a wire rope, a stuffing box and a packing of viscid material filling the interstices of said rope.

6. The combination of a wire rope, a stuffing box, and a packing of plastic material filling the interstices of said rope, said plastic material comprising a considerable proportion of beeswax.

7. The combination of a wire rope, a stuffing box, and a packing of plastic material filling the interstices of said rope, said plastic material comprising a mixture of beeswax and resin.

8. The combination of a wire rope, a stuffing box, and a packing of plastic material filling the interstices of said rope, said plastic material comprising a mixture of beeswax and resin in substantially equal proportions.

Signed at St. Louis, Missouri, this 18th day of December, 1906.

BENJAMIN BRAZELLE.

Witnesses:
JAMES A. CARR,
JULIA B. MEGOWN.